US011101899B2

(12) United States Patent
Elfström et al.

(10) Patent No.: US 11,101,899 B2
(45) Date of Patent: Aug. 24, 2021

(54) METHOD AND NODE FOR ENABLING OTA TESTING OF AN EUT

(71) Applicant: TELEFONAKTIEBOLAGET LM ERICSSON (PUBL), Stockholm (SE)

(72) Inventors: Torbjörn Elfström, Fjärås (SE); Aurelian Bria, Nacka (SE); Jonas Fridén, Mölndal (SE); Elena Pucci, Stockholm (SE); Aidin Razavi, Gothenburg (SE); Anders Stjernman, Lindome (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 113 days.

(21) Appl. No.: 15/770,972

(22) PCT Filed: Mar. 22, 2018

(86) PCT No.: PCT/EP2018/057282
§ 371 (c)(1),
(2) Date: Apr. 25, 2018

(87) PCT Pub. No.: WO2018/172451
PCT Pub. Date: Sep. 27, 2018

(65) Prior Publication Data
US 2019/0081713 A1 Mar. 14, 2019

Related U.S. Application Data

(60) Provisional application No. 62/476,137, filed on Mar. 24, 2017.

(51) Int. Cl.
*H04B 17/15* (2015.01)
*H04B 7/06* (2006.01)
(Continued)

(52) U.S. Cl.
CPC ........... *H04B 17/15* (2015.01); *H04B 7/0408* (2013.01); *H04B 7/0617* (2013.01); *H04B 17/101* (2015.01); *H04B 17/102* (2015.01)

(58) Field of Classification Search
CPC .... H04B 17/00; H04B 17/0085; H04B 17/29; H04L 43/50
See application file for complete search history.

(56) References Cited

U.S. PATENT DOCUMENTS 9,923,647 B1 * 3/2018 Olgaard ................. H04B 17/12
9,985,733 B1 * 5/2018 Lee ......................... H04B 17/29
(Continued)

FOREIGN PATENT DOCUMENTS

CN 102830298 A 12/2012
CN 104380618 A 2/2015

OTHER PUBLICATIONS

International Preliminary Report on Patentability dated May 13, 2019 issued in International Application No. PCT/EP2018/057282. (18 pages).

(Continued)

*Primary Examiner* — Shukri Taha
(74) *Attorney, Agent, or Firm* — Rothwell, Figg, Ernst & Manbeck, P.C.

(57) ABSTRACT

The embodiments herein relate to a method performed by a communication node (103) for enabling OTA testing. The communication node (103) comprises at least one active antenna (310). The communication node (103) transmits a test signal OTA by emitting a radiation pattern from the active antenna (310). The active antenna (310) scans two or more directions when emitting the radiation pattern.

19 Claims, 8 Drawing Sheets

(51) Int. Cl.
　　　*H04B 17/10*　　　(2015.01)
　　　*H04B 7/0408*　　(2017.01)

(56) References Cited

U.S. PATENT DOCUMENTS

| | | | |
|---|---|---|---|
| 10,033,473 B1* | 7/2018 | Kyrolainen | H04B 17/3911 |
| 2011/0319029 A1* | 12/2011 | Caudill | H04W 24/08 |
| | | | 455/67.11 |
| 2012/0071107 A1 | 3/2012 | Falck et al. | |
| 2013/0301454 A1 | 11/2013 | Seol et al. | |
| 2016/0226601 A1 | 8/2016 | Hu et al. | |
| 2016/0285583 A1 | 9/2016 | Kasher et al. | |
| 2017/0093509 A1* | 3/2017 | Kyosti | H04W 24/06 |
| 2017/0122049 A1* | 5/2017 | Davies | E21B 33/128 |
| 2017/0214427 A1* | 7/2017 | Chayat | H04B 1/48 |
| 2018/0006745 A1* | 1/2018 | Vanwiggeren | H04B 17/354 |
| 2019/0124529 A1* | 4/2019 | Garcia | H04B 1/18 |

OTHER PUBLICATIONS

International Search Report and Written Opinion issued in Application No. PCT/EP2018/057282 dated Jun. 25, 2018, 19 pages.

Rohde & Schwarz, "Antenna Array Testing-Conducted and Over the Air: The Way to 5G", White Paper Table of Contents, 1MA286_2e, Mar. 20, 2017, XP055429495, 30 pages.

3GPP TS 36.211, V15.0.0, 3rd Generation Partnership Project; Technical Specification Group Radio Access Network; Evolved Universal Terrestrial Radio Access (E-UTRA); Physical channels and modulation, (Release 15), (Dec. 2017), 219 pages.

3GPP TS 37.105, V15.0.0, 3rd Generation Partnership Project; Technical Specification Group Radio Access Network; Active Antenna System (AAS) Base Station (BS) transmission and reception, (Release 15), (Dec. 2017), 216 pages.

3GPP TS 38.104, V15.1.0, 3rd Generation Partnership Project; Technical Specification Group Radio Access Network; NR; Base Station (BS) radio transmission and reception, (Release 15), (Mar. 2018), 133 pages.

3GPP TS 38.211, V15.1.0, 3rd Generation Partnership Project; Technical Specification Group Radio Access Network; NR; Physical channels and modulation, (Release 15), (Mar. 2018), 87 pages.

Rohde and Schwarz, "Antenna Array Testing—Conducted and Over the Air: The Way to 5G White Paper", "1MA286_2e_AntArrTest_5G", URL: http://www.rohde-schwarz.com/tw/applications/antenna-array-testing-conducted-and-over-the-air-the-way-to-5g-white-paper_230854-353344.html; Nov. 2016 (35 pages).

* cited by examiner

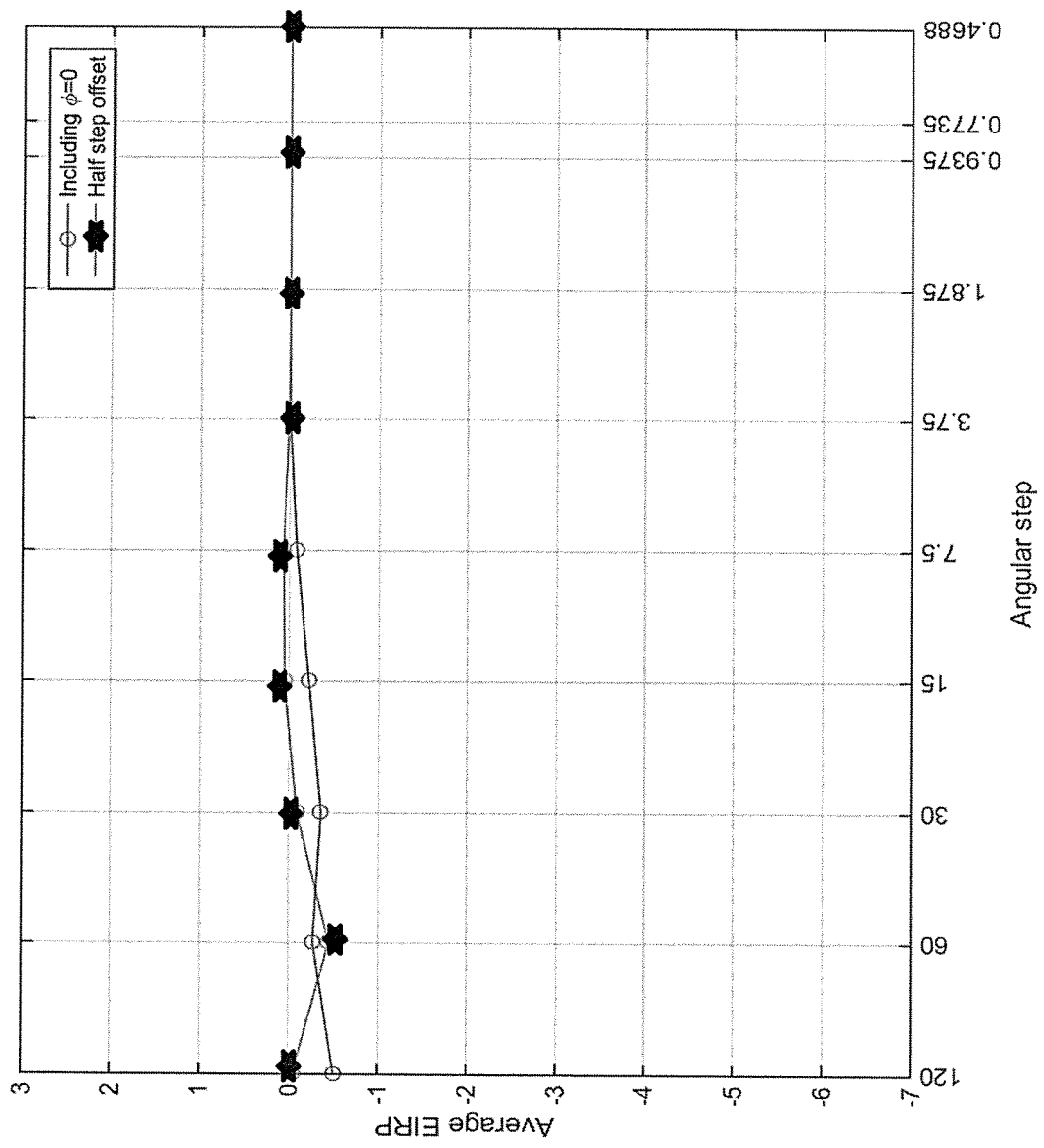

METHOD AND NODE FOR ENABLING OTA TESTING OF AN EUT

CROSS REFERENCE TO RELATED APPLICATION(S)

This application is a 35 U.S.C. § 371 National Stage of International Patent Application No. PCT/EP2018/057282, filed Mar. 22, 2018, designating the United States and claiming priority to U.S. provisional application No. 62/476, 137, filed on Mar. 24, 2017. The above identified applications are incorporated by this reference.

TECHNICAL FIELD

Embodiments herein relate generally to an Equipment Under Test (EUT) and a method performed by the EUT. Embodiments herein relate to enabling Over The Air (OTA) testing.

BACKGROUND

Active Antenna Systems (AASs) are an important part of the Long Term Evolution (LTE) and an essential part of the fifth Generation New Radio (5G NR), which is the new standard for 5G wireless technology capable of much faster and efficient networks compared to younger generations. An AAS of, e.g. a radio base station, incorporates multiple transmitters and/or receivers integrated with an antenna array, enabling Multiple Input Multiple Output (MIMO) beamforming and spatial interference rejection capabilities to improve capacity and coverage. An AAS has a radiation pattern which is dynamically adjustable and can be set in a large number of configurations, corresponding to the individual phase and amplitude for each antenna element, modulation format, output power etc. As a consequence, the total number of configurations can be huge. Another consequence is that measurement times can be extremely long.

The lack of available Radio Frequency (RF) spectrum and the need for increased capacity has led to moving to high frequencies, i.e., millimeter (mm) waves. Moreover, Multi-User MIMO (MU-MIMO) has a huge potential to serve a multitude of users with high capacity data traffic. This technique is envisioned to be a corner stone of the 5G standard [5Gref], and it requires use of array antennas in the base stations. At mm-waves, these arrays will most probably be integrated with the radio to avoid losses in connectors and cables. Moreover, a high gain antenna is useful to have for obtaining an acceptable link budget between the base station and the User Equipment (UE). This leads to antenna arrays with a multitude of active antenna elements, i.e., with individual power amplifiers and amplitude and/or phase controls.

Antennas, base stations, AASs etc. are tested to ensure that they meet specifications or simply to be characterized. Traditional base stations, with the antenna board separated from the radio unit, can be characterized and tested by measuring directly at the Antenna Reference Point (ARP), i.e., conducted measurements. This point is typically a well-defined cross section of the antenna connector. For connector-less integrated antenna-radio solutions, the ARP is not accessible and the testing point and/or surface must be moved out of the antenna system, i.e., OTA testing. Parameters for OTA testing are radiated transmit power, sensitivity, etc. These parameters are assessed in the fundamental band of the system, but also in wide frequency ranges from 30 Mega Hertz (MHz) up to five times the fundamental frequency see [5Gspec], for Electromagnetic Compatibility (EMC) certification. These measurements are done in a free-space controllable environment, without impact of fading, noise and reflections, such as an Anechoic Chamber, a Compact Antenna Test Range (CATR), Reverberation Chambers. The testing point and/or surface can be in the far-field or near-field of the tested antenna system.

In the Third Generation Partnership Project (3GPP) Release-13 (Rel-13) version of the Technical Specification (TS) 37.145, a limited number of OTA requirements have been introduced for example related to radiated transmit power and OTA sensitivity. 3GPP Release 15 has now the ambition to develop a specification with all RF requirements defined also OTA.

Also, there are regulatory requirements and/or specific customer requirements asking for radiated transmit power, carrier frequency stability to be verified OTA.

When the testing device is typically run in a test mode, it should be designed to be relevant for the tested parameter. For Evolved-Universal Terrestrial Radio Access (E-UTRA), three distinct classes of E-UTRA Test Models (E-TM) are defined: E-TM1, E-TM2 and E-TM3. The first and third classes have further sub-classes. All test models share the following attributes:
  Defined for a single antenna port, single code word, single layer with no precoding.
  Duration of one frame, e.g. 10 ms.
  Normal cyclic prefix.
  Localized virtual resource blocks, no intra sub-frame hopping for a Physical Downlink Shared Channel (PDSCH).
  Cell-specific reference signals only. No use of UE specific reference signals.

The data content of the PDSCH is generated from a sequence of zeros scrambled using a length-31 Gold code according to 3GPP TS 36.211, as are the reference signals and the primary and secondary synchronization signals. The physical channels Physical Broadcast Channel (PBCH), Physical Control Format Indicator Channel (PCFICH), Physical channel HybridARQ Indicator Channel (PHICH) and Physical Downlink Control Channel (PDCCH) all have detailed definitions. For each E-TM, every physical signal and physical channel is allocated into the channel at a specific power relative to the reference signal power. There are six different mappings for each E-TM to take account of the six different channel bandwidths. The corresponding functionality for the physical layer of 5G NR is found in 3GPP TS 38.221.

Test model E-TM1.1 may be used for E-UTRA base station unwanted emission.

Using the concept of test models for testing an AAS base station would imply that the wanted signal is static in terms of beam peak direction.

Typically, active components, i.e. components with internal power generation, will generate unwanted emission, such as intermodulation, harmonics and mixing products. The intermodulation will generate mixing products affecting the spectral properties close to the carrier (spectrum regrowth) and emission in the spurious domain. Harmonics is typically related to multiples of the carrier frequency. The carrier can also mix with the local oscillator frequency and intermediate frequency in different combinations.

When testing radiated transmit power in an anechoic chamber the number of needed angular measurement points can be very large. This is due to the fine angular resolution of fixed configuration radiation patterns of antennas or any source of emission of large dimensions compared to a wave length at the actual frequency. At mm-waves the wave length is around 10 mm and below.

Therefore, there is a need to at least mitigate or solve these issues.

SUMMARY

An objective of embodiments herein is therefore to obviate at least one of the above disadvantages and to provide an improved OTA test.

According to a first aspect, the object is achieved by a method performed by a communication node for handling OTA testing. The communication node comprises at least one active antenna. The communication node transmits a test signal from the communication node OTA by emitting a radiation pattern from the active antenna. The active antenna scans two or more directions when emitting the radiation pattern.

According to a second aspect, the object is achieved by a communication node for handling OTA testing. The communication node comprises at least one active antenna. The communication node is adapted to transmit a test signal from the communication node OTA by emitting a radiation pattern from the active antenna. The active antenna is adapted to scan two or more directions when emitting the radiation pattern.

Thanks to the scanning in two or more directions, an improved OTA test of the EUT is provided.

Embodiments herein afford many advantages, of which a non-exhaustive list of examples follows:

One advantage of the embodiments herein is that they effectively increase the needed angular resolution which allows for reducing the sampling grid when measuring unwanted emission in the OTA domain. This will severely reduce the overall test time.

Another advantage is that when the angular resolution is increased, the angular accuracy can be relaxed while maintaining a similar Measurement Uncertainty (MU).

Another advantage of the embodiments herein is that a more realistic testing of the EUT is possible compared to using the fixed beam test signal.

Another advantage of the embodiments herein is that the risk of missing an emission is reduced which improves the overall MU of the test method.

A further advantage of the embodiments herein is that less complex positioners such as a turntable may be used in the test range, which reduces the cost for the equipment.

Another advantage of the embodiments herein is that the measuring time is reduced as the corresponding relaxed need for dense angular sampling results in fewer measurement points.

With the embodiments herein, all relevant states, beam configurations, of the EUT are tested.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 8 is a graph illustrating TRP in a cut calculated as mean values of the EIRP and for different angular resolutions using a scanned beam.

The drawings are not necessarily to scale and the dimensions of certain features may have been exaggerated for the sake of clarity. Emphasis is instead placed upon illustrating the principle of the embodiments herein.

DETAILED DESCRIPTION

With a static test signal, the spatial characteristics of the unwanted emission will be static, meaning that emission could be beam-formed in certain directions. With emission that could be beam-formed in a large frequency range starting at 30 MHz going to 100 GHz or more, the challenge is to find a practical OTA test method with reasonable cost and required test time. Using a scanning beam test signal is therefore used for OTA testing. During emission testing of a EUT, array excitations are swept. The array excitations are swept by applying different amplitude and phase to each antenna element in a certain sequence to control the beam direction related to the wanted signal. Note that the EIRP accuracy requirement must be fulfilled before the beams are swept. Each state will give a certain pattern. It is the sequence of these patterns that is referred to above. If single main-lobe beams are used, one can say "sequence of pointing directions" but it could be more general than that, e.g. using an LTE code book.

The beam scanning can be defined in different ways depending on the layout of the communication system. If a code-book based system is used, see TS 38.221, the beam states of the code-book can be used. If no pre-defined beam configurations are at hand, e.g. reciprocity based beam forming, the beam scanning sequence can be defined such that during the beam scan, in-band service area requirements are met, e.g. as defined in TS 37.105, sub-clause 9.2, and TS 38.104, sub-clause 9.2. Important aspects are to define the beam sequence of transmitted beams to: maximize the radiated transmit power, use a realistic beam switching rate, and provide coverage of the service area when used in-band. Moreover, the beam can be swept such that subsequent configurations correspond to ordered or random beam peak directions.

Using a beam scanning test mode would lead to that the directivity of the transmitted beam is reduced from a high value due to beamforming to a low value corresponding to the average element gain. For in-band operation the magnitude of this drop is roughly the number of antenna elements. A lowered directivity is equivalent to a decreased angular resolution implying that fewer angular points are needed in OTA testing, which will help to reduce the test time.

Figure 1:
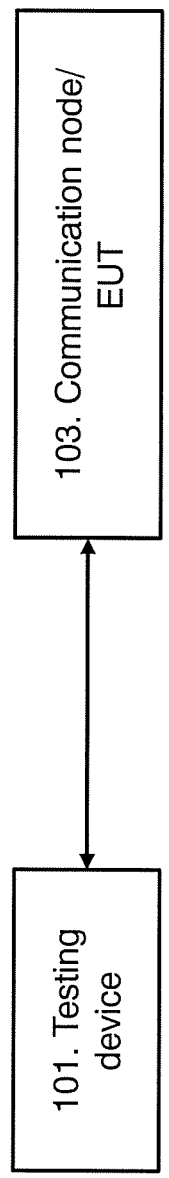
FIG. 1 is a schematic block diagram illustrating a system.

FIG. 1 illustrates a testing device 101 which may execute testing of a communication node/EUT 103. The communication node 103 may be referred to as a EUT, and the term EUT together with reference number 103 will be used herein when referring to the communication node 103. When testing the EUT 103, it may be one or more of the EUT's 103 antennas that are tested. The testing may be performed by using a test signal transmitted by the EUT 103 and received by the testing device 101. The test signal may also be described as one or more radio waves or beams transmitted or emitted by the EUT 103. The EUT 103 may be for example an AAS base station, a UE, a NodeB, an eNodeB, a GnodeB, a Radio Network Controller (RNC) or any other device that can be used in the system and needs to be tested. The EUT 103 which is tested may also be referred to as a test object, or an object to be tested. The testing device 101 may receive the test signal from the EUT 103 and perform measurements and analysis of the received signal.

The testing device 101 may be connected to the EUT 103 via a wired link or via a wireless link. The testing device 101 may be for example a computer, another EUT 103 etc. The testing may be done by measuring parameters such as Radio Frequency (RF) characteristic parameters associated with the EUT 103.

Figure 2:
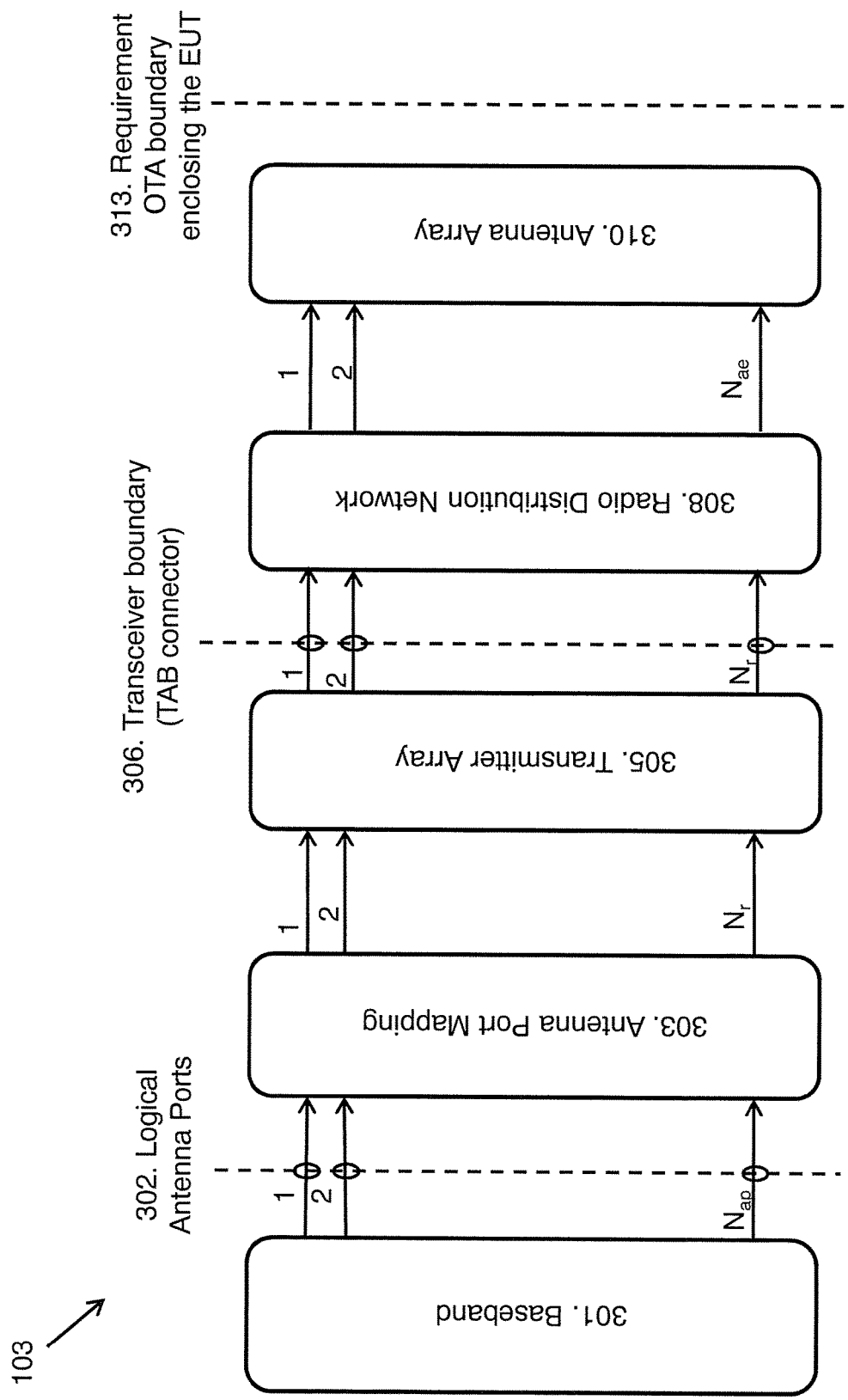
FIG. 2 is a schematic block diagram illustrating a EUT.

The EUT 103 may comprise base band equipment, radio equipment and at least one antenna (see also FIG. 2). In an AAS base station with a multiple enclosure solution, the EUT 103 is constituted by the radio equipment and the antenna. In this case, the baseband equipment is separated from the radio equipment and is not part of the EUT 103. Note that there may be e.g. an optical connection between the baseband and the radio equipment.

The EUT 103 has a certain node setting during the testing. Information regarding the node setting is stored in the EUT 103. In addition, the information regarding the node setting may be stored in an external memory, the testing device 101, in a cloud memory, or any other suitable memory which is accessible using wireless or wired communication by the EUT 103 and/or the testing device 101. The node setting may be band configuration, output power etc. of the EUT 103 during the measurement of the parameters.

A reference node (not illustrated in FIG. 1) may be also used in the testing in order to transmit radio waves OTA from the testing device 101 to the EUT 103, and to receive radio waves OTA transmitted from the EUT 103 to be further transmitted to the testing device 101. The reference node could be moving to scan the electrical field over the whole antenna aperture of the EUT 103. The testing device 101 may be connected to the reference node via a wired link or via a wireless link. The reference node may also be referred to as a probe antenna and as a test range antenna. In some embodiments, the reference node and the EUT 103 are co-located in one node.

FIG. 2 depicts an example of a EUT architecture. The EUT 103 is exemplified with baseband 301 which is illustrated on the left hand side of the FIG. 2. The EUT 103 comprises logical antenna ports 302 (represented with the left most vertical dotted line in FIG. 2) connected to the baseband 301. The logical antenna ports 302 are not physical antennas but logical entities comprised in the EUT 103 and they may be distinguished by their reference signal sequences. Multiple antenna port signals may be transmitted by one single transmit antenna, and a single antenna port can be spread across multiple transmit antennas. The logical antenna ports 302 are mapped to the physical transmit antennas in the transmitter array 305 of the EUT 103 using the antenna port mapping 303. There is a transceiver boundary 306 (TAB connector, represented with the middle dotted vertical line in FIG. 2) between the transmitter array 305 and the radio distribution network 308. The radio distribution network 308 is connected to an antenna array 310. The antenna array 310 comprises two or more antennas. The antennas may be transmitting antennas, receiving antennas or transceiver antennas. The right most dotted vertical line in FIG. 2 represents a requirement boundary at a surface enclosing the EUT 313. Note that FIG. 2 illustrates an example of a EUT architecture, and that the EUT 103 may comprise fewer or more entities than the ones exemplified in FIG. 2. At least the antenna port mapping 303 and the radio distribution network 308 are involved in creation of the test signal, i.e. the beamforming.

The EUT 103 may further comprise a memory comprising one or more memory units. The memory is arranged to be used to store data, received data streams, power level measurements, beam information, test signal, beam sweep rate, codebook, output power, threshold values, time periods, configurations, schedulings, and applications to perform the methods herein when being executed in the EUT 103.

The embodiments herein relate to a test signal described by the test model. The embodiments herein also relate to changing the weighting factors, e.g. phase, gain) in the antenna port mapping 303 or by looping though the code book in the defined pre-coder. The weighting factor may be for example a constant phase gradient or Taylor taper weights or any optimized antenna weights designed to generate a desired antenna pattern. An example of a codebook is found in 3GPP TS 38.211. A defined pre-coder may be described as a standardized set of antenna weights that is used to generate beams pointing in different directions.

The test mode of the EUT 103 is enabled in the test phase in a similar fashion as the traditional concept of having different test models for different requirements. In the prior art, a test signal is generated by the logical antenna ports, but in the embodiments herein it may be at least the antenna port mapping 303 and the radio distribution network 308 which generates the test signal.

Figure 3:
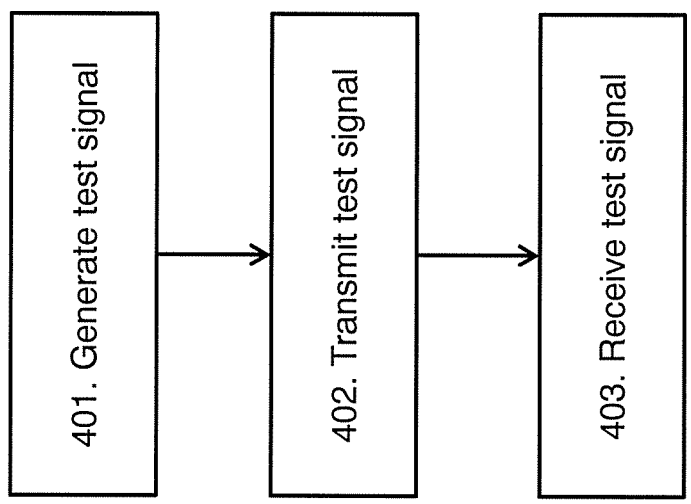
FIG. 3 is a flow chart illustrating a method.

FIG. 3 is a flowchart describing a method. The method comprises at least one of the following steps, which steps may be performed in any suitable order than described below:

Step 401

The EUT 103 generates a test signal. The test signal may be a scanning beam test signal. A prerequisite may be that test mode is enabled in the EUT 103. It may be the antenna port mapping 303 and the radio distribution network 308 of the EUT 103 which generates the test signal.

Step 402

The EUT 103 transmits the test signal OTA by emitting a radiation pattern from the active antenna 310. The active antenna 310 scans two or more directions when emitting the radiation pattern. Emitting a radiation pattern may also be described as emitting a beam, or emitting a beam using a radiation pattern. Thus, the test signal may be described as a radio beam or a radiation pattern.

When transmitting the test signal, it may be seen as the EUT 103 being in test mode. Test mode properties of the EUT 103 can be verified in-band. When the EUT 103 is configured, the test signal is transmitted.

The antenna comprised in the EUT 103 from which the test signal is transmitted may be an integrated or non-integrated active antenna. In an integrated antenna, the antenna power generation and the radiating parts are integrated and there is no possibility to measure the power out from the generator before it enters the radiating parts. Therefore, we need to measure in the air, and in the air interface we have all the problems with angular grid.

The test signal in the form of the antenna beam is transmitted from the EUT 103 in at least two directions. Thus, the antenna beam is moved in at least two directions and may also be referred to as a scanning beam test signal. When the beam moves, it does not stand still, i.e. the beam is not fixed. Using other words, the antenna of the EUT 103 scans at least two directions when emitting the beam. This may also be described as the antenna of the EUT 103 scans different angles when emitting the beam. In this way, the antenna spreads the emission in the one dimensional domain and/or the spatial domain.

The radiation pattern is emitted from the EUT 103 with maximum output power. The maximum output power may be different from different EUTs 103, and may be configured by the manufacturer of the EUT 103.

Transmitting the radiation pattern by scanning at least two directions is enabled by using beamforming. As mentioned above, beamforming can be described as controlling the directionality of transmission and reception of signals or beams, i.e. forming the beams. Scanning at least two directions is the same as changing the weighting factors and looping through the codebook.

The antenna of the EUT 103 may be described as being in scanning test mode or frequency sweep test mode. In such mode, the antenna moves from a start frequency to a stop frequency, e.g. covering the carrier band-width, at a certain sweep rate or scanning rate when emitting the beam, e.g. 0.5 ms, 1 ms or n ms or any other suitable rate. The test signal may also include frequency sweep, either one beam sweep per frequency or a linked beam-frequency sweep. The test signal may have a beam sweep rate corresponding to normal operating providing transmission of synchronization signals and broadcast data within the intended coverage area.

Step 403

The testing device 101 may receive the test signal from the EUT 103, and perform e.g. measurements and analysis based on the received test signal. For example, a mean value of the EIRP and for different angular resolutions may be calculated in step 403 by the testing device 101 and based on the received test signal. The testing device 101 may therefore be described as measuring emissions from the EUT 103.

Figure 4:
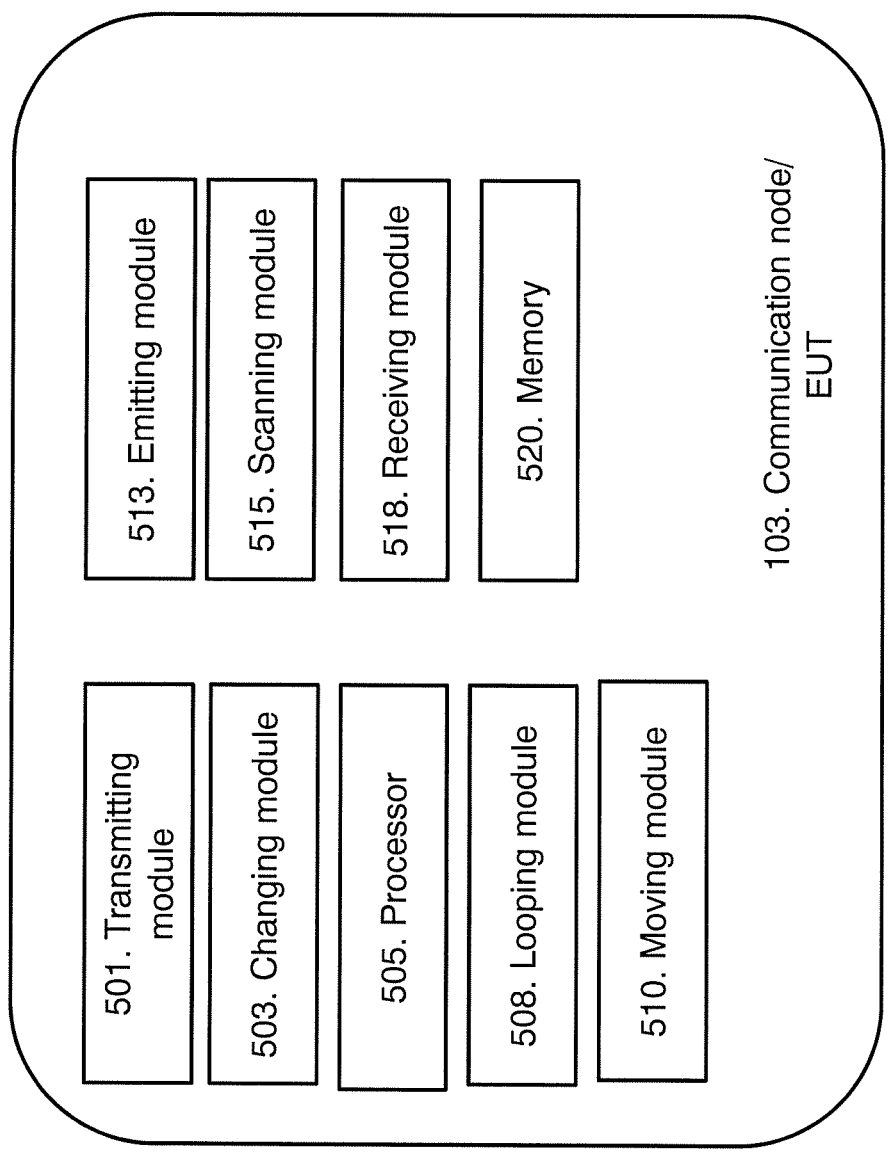
FIG. 4 is a schematic block diagram illustrating an example of a EUT.

To perform the method steps shown in FIG. 3 for enabling OTA testing, the communication node 103 comprises an arrangement as shown in FIG. 4. The communication node 103 comprises at least one active antenna 310.

The communication node 103 is adapted to, e.g. by means of a transmitting module 501, transmit a test signal OTA by emitting a radiation pattern from the active antenna 310. The active antenna 310 is adapted to scan two or more directions when emitting the radiation pattern. The transmitting module 501 may also be referred to as a transmitting unit, a transmitting means, a transmitting circuit, means for transmitting, output unit etc. The transmitting module 501 may be a transmitter, a transceiver etc. The transmitting module 501 may be a wireless transmitter of the communication node 103 of a wireless or fixed communications system.

The communication node 103 may be further adapted to, e.g. by means of a changing module 503, change at least one weighting factor in an antenna port mapping 303 in the communication node 103 for the emitted radiation pattern. The changing module 503 may also be referred to as a changing unit, a changing means, a changing circuit, means for changing etc. The changing module 503 may be a processor 505 of the communication node 103 or comprised in the processor 505 of the communication node 103.

The communication node 103 may be being further adapted to, e.g. by means of a looping module 508, loop a code book in a pre-coder for the emitted radiation pattern. The looping module 508 may also be referred to as a looping unit, a looping means, a looping circuit, means for looping etc. The looping module 508 may be the processor 505 of the communication node 103 or comprised in the processor 505 of the communication node 103.

The communication node 103 may be further adapted to, e.g. by means of a moving module 510, move the active antenna 310 from a start frequency to a stop frequency at a sweep rate or scanning rate when emitting the radiation pattern. The moving module 510 may also be referred to as a moving unit, a moving means, a moving circuit, means for moving etc. The moving module 510 may be the processor 505 of the communication node 103 or comprised in the processor 505 of the communication node 103.

The communication node 103 may be further adapted to, e.g. by means of an emitting module 513, emit the radiation pattern with maximum output power. The emitting module 513 may also be referred to as an emitting unit, an emitting means, an emitting circuit, means for emitting etc. The emitting module 513 may be the processor 505 of the communication node 103 or comprised in the processor 505 of the communication node 103. The emitting module 513 may be the same as the transmitting module 501.

At least one of an antenna port mapping 303 and a radio distribution network 308 comprised in the communication network 103 may be adapted to generate the test signal.

The communication node 103 may be further adapted to, e.g. by means of a scanning module 515, scan in at least two directions using beamforming. The scanning module 515 may also be referred to as a scanning unit, a scanning means, a scanning circuit, means for scanning etc. The scanning module 515 may be the processor 505 of the communication node 103 or comprised in the processor 505 of the communication node 103.

The communication node 103 may be adapted to, e.g. by means of a receiving module 518, receive signals, beams, from other nodes, e.g. the testing device 101. The receiving module 518 may also be referred to as a receiving unit, a receiving means, a receiving circuit, means for receiving, input unit etc. The receiving module 518 may be a receiver, a transceiver etc. The receiving module 518 may be a wireless receiver of the communication node 103 of a wireless or fixed communications system.

The communication node 103 may comprise a memory 520, and the memory 520 comprises instructions executable by the processor 505 for executing the method described herein.

Figure 5:
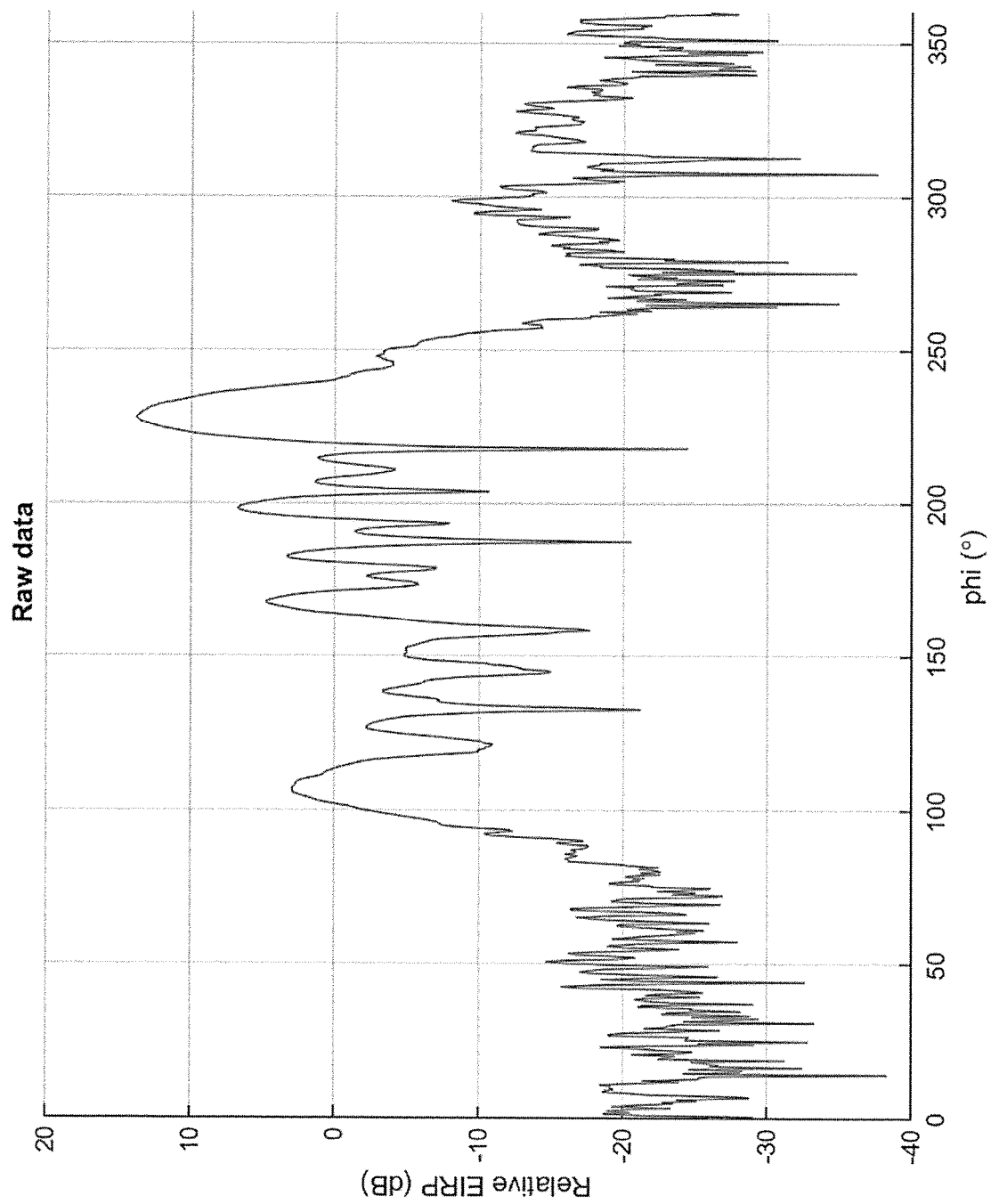
FIG. 5 is a graph illustrating emissions with the wanted beam fixed at a certain direction.

FIG. 5 is a graph illustrating an example with raw data for emissions from the EUT 103 with the wanted beam fixed at a certain direction. The x-axis of the graph represents phi and is measured in degrees °. The y-axis represents relative EIRP measured in Decibel (dB).

Figure 6:
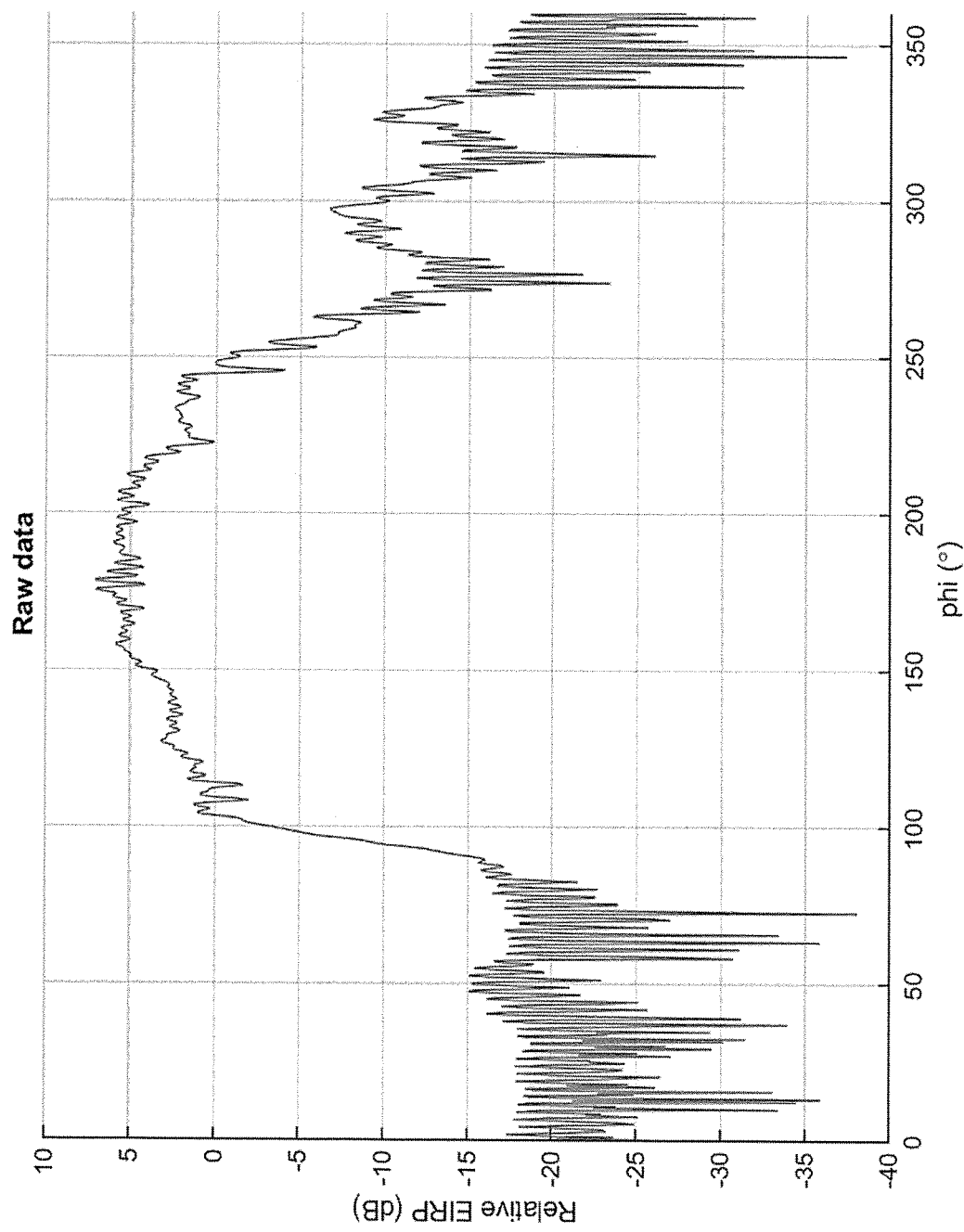
FIG. 6 is a graph illustrating emission where the wanted beam is scanned through different directions.

FIG. 6 is a graph illustrating an example with raw data for emission from the EUT 103 where the wanted beam is scanned through different directions in contrast to one direction in FIG. 5, which spreads the emission in the spatial domain, according to the embodiments herein. The x-axis of the graph represents phi measured in degrees °. The y-axis represents relative EIRP measured in dB.

Figure 7:
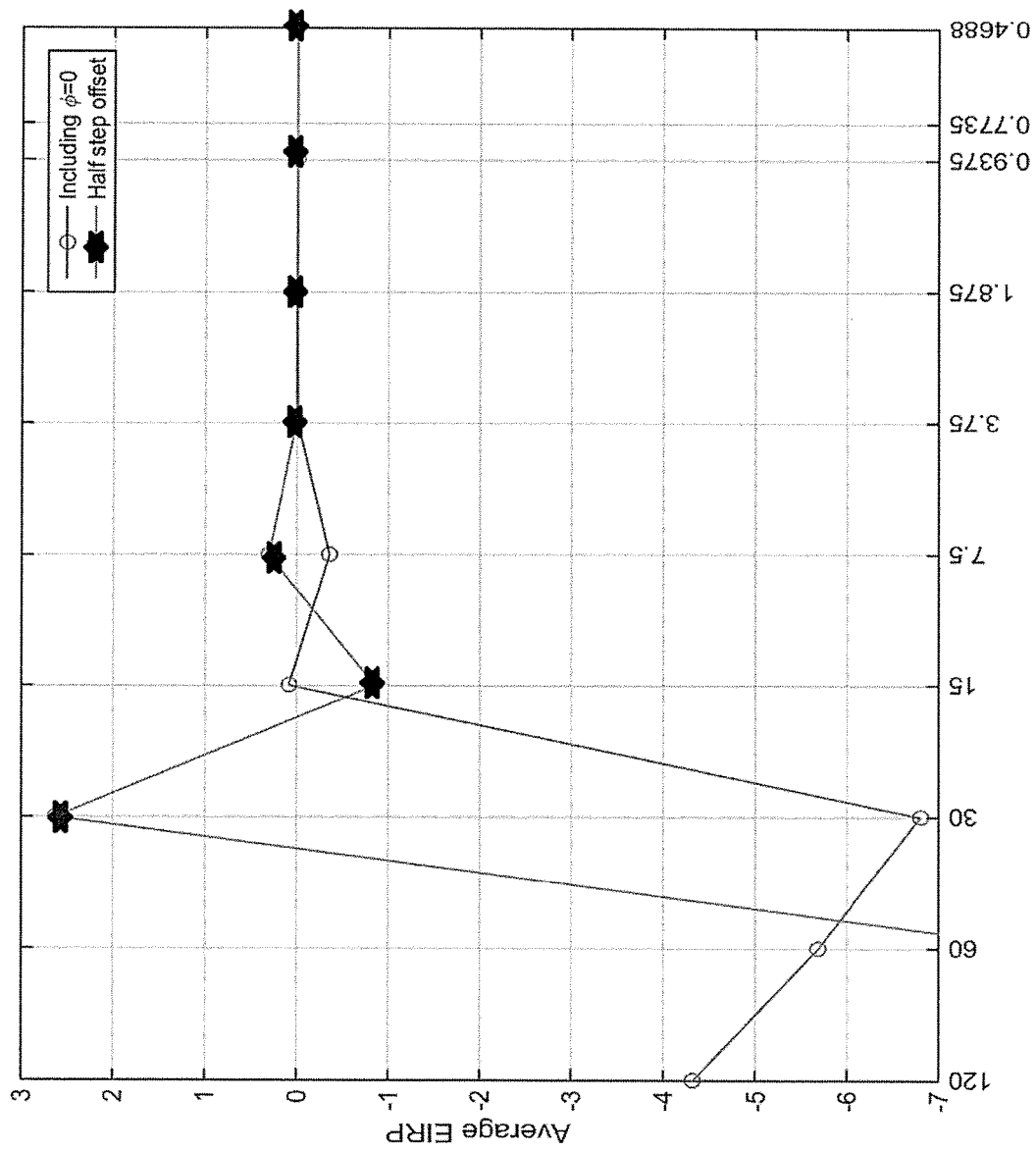
FIG. 7 is a graph illustrating TRP in a cut calculated as mean values of the Equivalent Isotropic Radiated Power (EIRP) and for different angular resolutions using a fixed beam configuration.

FIG. 7 is a graph illustrating an example for TRP in a cut calculated as mean values of the EIRP and for different angular resolutions, and using the data of FIG. 5 i.e. a fixed beam test signal. FIG. 7 illustrates two curves, the curve with circles includes φ=0 and the other curve with stars is for a half step offset. The two curves depict the average value from two sets of angles: one with the zero angle included, and the other one with the grid shifted a half angular step. For 7.5 degree resolution and finer the error is below 1 dB. The x-axis of the graph represents the angular step and the y-axis represents average EIRP.

Total Radiated Power (TRP) may be described as a measure of the amount of power which is emitted by an antenna of the EUT 103 when the antenna is connected to an actual radio or transmitter. TRP is an active measurement in that a powered transmitter is used to transmit through the antenna. The total transmitted power is calculated and summed up over all possible angles and the result is the TRP. TRP is used to quantify general spurious emission, e.g. −13 dBm in US.

FIG. 8 is a graph illustrating an example for TRP in a cut calculated as mean values of the EIRP and for different angular resolutions, and using data of FIG. 6 i.e. a scanning beam test signal (in contrast to the fixed beam in FIG. 7). FIG. 8 illustrates two curves, the curve with circles includes φ=0 and the other curve with stars is for a half step offset. The TRP in this case is more or less independent of angular resolution. In fact at all resolutions the error is below 1 dB. The x-axis of the graph represents the angular step and the y-axis represents average EIRP.

The embodiments described herein may be implemented through one or more processors, such as a processor 505 in the EUT 103, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the EUT 103. One such carrier may be in the form of a CD ROM disc. It is however feasible with other data carriers such as a memory stick. The computer program code can furthermore be provided as pure program code on a server and downloaded to the EUT 103.

The embodiments herein relate to:
1. Sweeping through the code-book
2. Random
3. Defined directions within coverage area The EIRP accuracy requirement must be fulfilled, then the beams are swept.

In any antenna measurement, the angular sampling points must be chosen adequately depending on the required post-processing. If the measured antenna patterns have rapid angular variations, e.g. as for beamforming antennas using many antenna elements and at high frequencies, a dense set of angular points is needed e.g. to calculate the angular average value which is required for total radiated power (TRP). Any effect that widens the beams of the radiation pattern will reduce the number of needed points and reduce measurement time.

Characteristics for the beam generations are added meaning that the beam weights also need to be captured in a dynamic fashion.

Embodiments herein relate to enable OTA testing and in particular assessment of TRP of unwanted emissions of the EUT.

Some embodiments described herein may be summarised in the following manner:

A method performed by a communication node 103 for handling OTA testing. The communication node 103 comprises at least one active antenna 310. The method comprises:

Transmitting 402 a test signal OTA by emitting a radiation pattern from the active antenna 310. The active antenna 310 scans two or more directions when emitting the radiation pattern.

A communication node 103 for handling OTA testing. The communication node 103 comprises at least one active antenna 310. The communication node 103 is adapted to:

Transmit a test signal OTA by emitting a radiation pattern from the active antenna 310. The active antenna 310 is adapted to scan two or more directions when emitting the radiation pattern.

Thanks to the scanning test signal and the transmission with maximum output power, an improved OTA test of the EUT is provided.

In some embodiments, a computer program may comprise instructions which, when executed on at least one processor, cause the at least one processor to carry out the method steps 401-403. A carrier may comprise the computer program, and the carrier is one of an electronic signal, optical signal, radio signal or computer readable storage medium.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear herein.

The invention claimed is:

1. A method performed by a communication node for enabling Over The Air (OTA) testing, wherein the communication node comprises at least one active antenna, the method comprising:
   transmitting a test signal OTA by emitting a radiation pattern from the active antenna, wherein the active antenna scans two or more directions when emitting the radiation pattern, wherein said two or more directions include a first direction and a second direction, and
   the active antenna scans said two or more directions when emitting the radiation pattern by i) during a first period of time, transmitting the test signal in the first direction but not in the second direction, and ii) during a second period of time, transmitting the test signal in the second direction but not the first direction.

2. The method of claim 1, wherein at least one weighting factor in an antenna port mapping in the communication node is changed for the emitted radiation pattern.

3. The method of claim 1, wherein a code book in a pre-coder is looped for the emitted radiation pattern.

4. The method of claim 1, wherein the active antenna moves from a start frequency to a stop frequency at a sweep rate or scanning rate when emitting the radiation pattern.

5. The method of claim 1, wherein the radiation pattern is emitted with maximum output power.

6. The method of claim 1, wherein at least one of an antenna port mapping and a radio distribution network comprised in the communication network generates the test signal.

7. The method of claim 1, wherein the scanning in at least two directions uses beamforming.

8. A communication node for enabling Over The Air (OA) testing, wherein the communication node comprises at least one active antenna, the communication node being adapted to:
- transmit a test signal OTA by emitting a radiation pattern from the active antenna, wherein
- the active antenna is adapted to scan two or more directions when emitting the radiation pattern, wherein
- said two or more directions include a first direction and a second direction, and
- the active antenna is adapted to scan said two or more directions when emitting the radiation pattern by i) during a first period of time, transmitting the test signal in the first direction but not in the second direction, and ii) during a second period of time, transmitting the test signal in the second direction but not the first direction.

9. The communication node of claim 8, being further adapted to change at least one weighting factor in an antenna port mapping in the communication node for the emitted radiation pattern.

10. The communication node of claim 8, being further adapted to loop a code book in a pre-coder for the emitted radiation pattern.

11. The communication node of claim 8, being further adapted to move the active antenna from a start frequency to a stop frequency at a sweep rate or scanning rate when emitting the radiation pattern.

12. The communication node of claim 8, being further adapted to emit the radiation pattern with maximum output power.

13. The communication node of claim 8, wherein at least one of an antenna port mapping and a radio distribution network comprised in the communication network is adapted to generate the test signal.

14. The communication node of claim 8, being further adapted to scan in at least two directions using beamforming.

15. A computer program product comprising a non-transitory computer readable medium storing a computer program comprising instructions which, when executed on at least one processor, cause the at least one processor to carry out the method of claim 1.

16. The method of claim 1, wherein the active antenna scans said two or more directions when emitting the radiation pattern by changing weighting factors of the active antenna or by looping through a code book in a pre-coder.

17. The method of claim 1, wherein
- the radiation pattern is an antenna beam, and
- the active antenna scans said two or more directions when emitting the radiation pattern by moving the antenna beam in said two or more directions.

18. The method of claim 17, wherein the active antenna comprises a set of antenna elements, and
- the step of moving the antenna beam in said two or more directions comprises applying different amplitude and phase to each antenna element in a sequence to control the antenna beam direction.

19. A method performed by a communication node for enabling Over The Air (OTA) testing, wherein the communication node comprises at least one active antenna which includes a plurality of antenna elements, the method comprising:
- transmitting from the active antenna a test signal in a first direction by applying a first combination of amplitudes and phases to the antenna elements during a first period of time, and
- transmitting from the active antenna the test signal in a second direction by applying a second combination of amplitudes and phases to the antenna elements during a second period of time which is subsequent to the first period of time.

* * * * *